United States Patent [19]
Bray

[11] Patent Number: 5,611,199
[45] Date of Patent: Mar. 18, 1997

[54] TWO STAGE ELECTROHYDRAULIC PRESSURE CONTROL VALVE

[75] Inventor: Steven C. Bray, Peoria, Ill.

[73] Assignee: Caterpillar Inc., Peoria, Ill.

[21] Appl. No.: 572,253

[22] Filed: Dec. 13, 1995

[51] Int. Cl.$^6$ .................................................. F16D 31/02
[52] U.S. Cl. ................................................ 60/404; 60/413
[58] Field of Search ............................. 60/413, 404, 405, 60/406

[56] References Cited

U.S. PATENT DOCUMENTS

| | | | |
|---|---|---|---|
| 3,985,063 | 10/1976 | Lemon | 60/413 X |
| 4,458,791 | 7/1984 | Schneider et al. | 60/413 X |
| 4,959,957 | 10/1990 | Schmale et al. | 60/413 |
| 5,020,322 | 6/1991 | Schwarz | 60/404 |
| 5,355,676 | 10/1994 | Inokuchi | 60/413 |

FOREIGN PATENT DOCUMENTS 1234388  6/1971  United Kingdom ...................... 60/413

*Primary Examiner*—John E. Ryznic
*Attorney, Agent, or Firm*—John W. Grant

[57] ABSTRACT

A two-stage electrohydraulic pressure control valve modulatably controls engagement of a spring applied, pressure released brake when electrical power directed thereto is suddenly lost. The control valve includes a shutdown valve mechanism between a pilot stage and a main stage to controllably reduce the fluid pressure in an accumulator storage chamber in three distinct stages. The first stage is the immediate blocking of fluid flow from the storage chamber by a flow control valve when fluid passing therethrough in one direction exceeds a predetermined flow rate. The second stage is reducing the fluid pressure in the storage chamber to a predetermined level by a relief valve when the flow control valve is in its flow blocking position. The third stage is accomplished by restricting fluid flow from the storage chamber at a predetermined flow rate through an orifice so that the main stage modulatably controls the reduction of fluid pressure in the brake chamber.

12 Claims, 3 Drawing Sheets

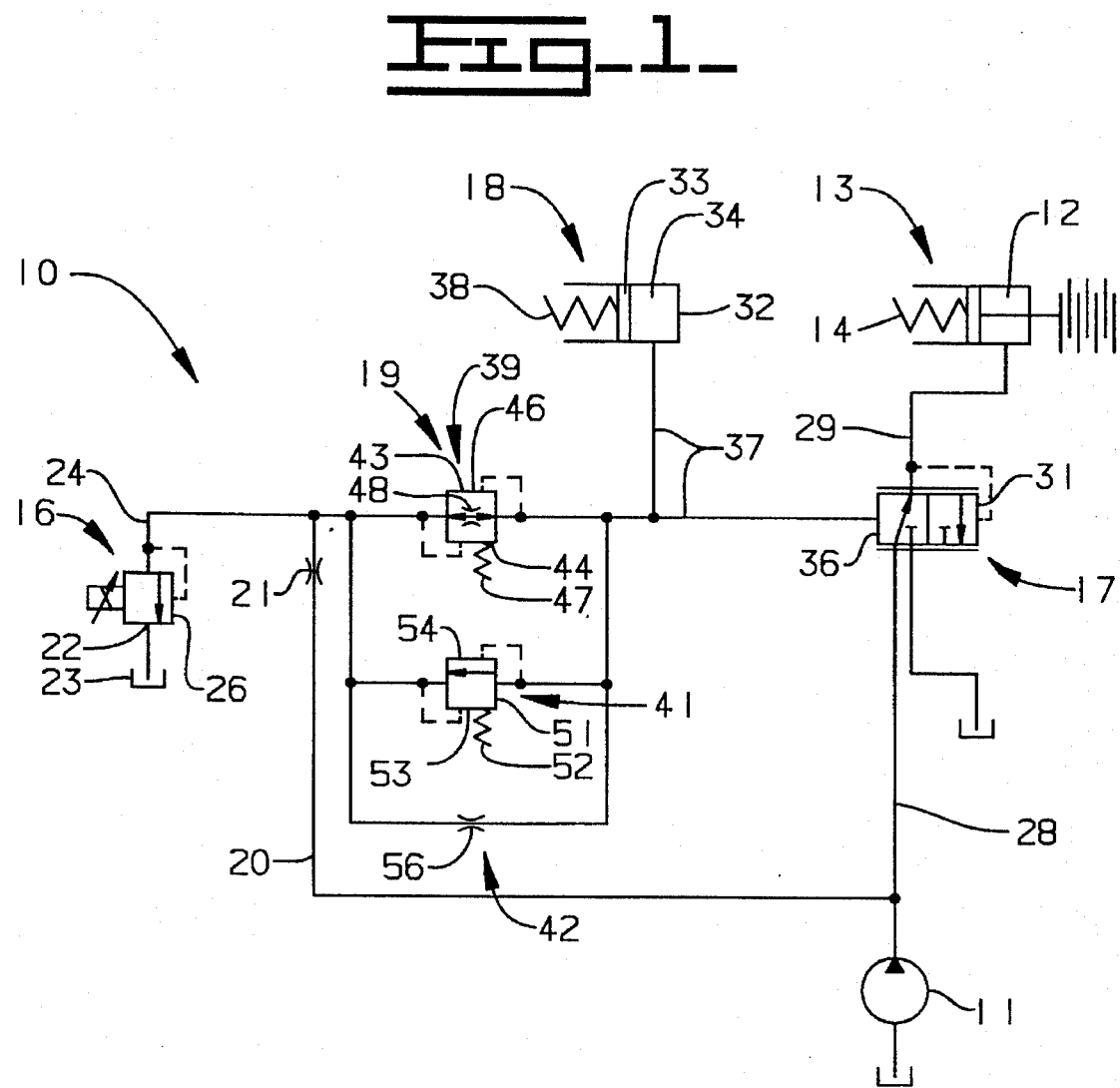
Fig_1_

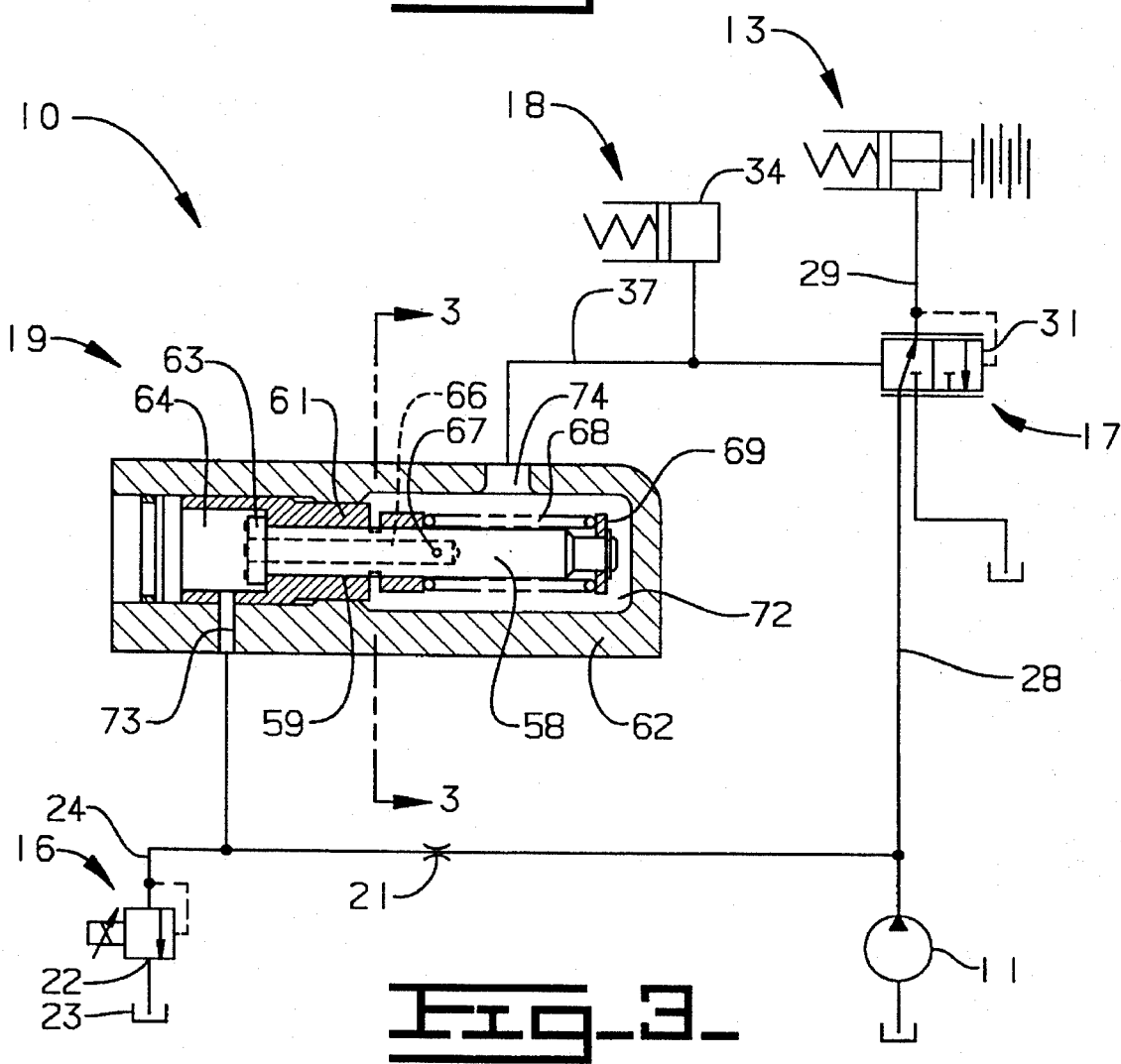
Fig_2_
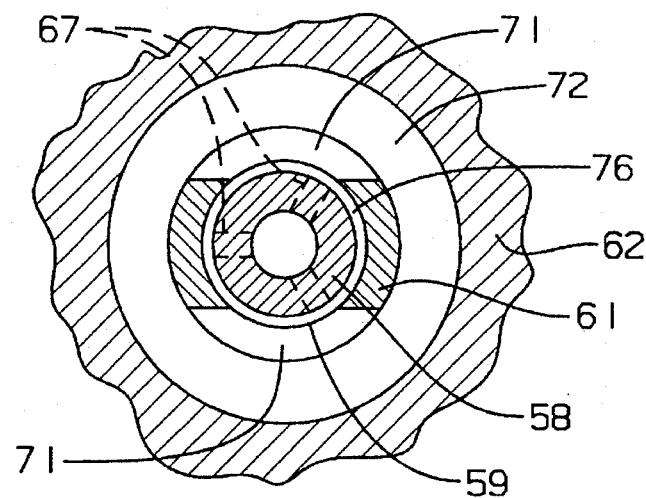
Fig_3_

5,611,199

TWO STAGE ELECTROHYDRAULIC PRESSURE CONTROL VALVE

TECHNICAL FIELD

This invention relates to a two stage electrohydraulic pressure control valve and, more particularly, to one suitable for controlling a spring applied pressure released brake in which the brake is controllably engaged when the electrical power to the control valve is lost.

BACKGROUND ART

Two stage electrohydraulic pressure control valves are increasingly being used in diverse applications for controlling such things as hydraulic control valves, brakes, clutches, and so forth. In many cases, those valves are controlled by a microprocessor and the control system, including such valves, can be made extremely versatile simply by changing the microprocessor program. One example is where a two stage electrohydraulic pressure control valve is used to controllably release and engage a spring applied pressure released brake. Such brakes are normally maintained in a disengaged position by a high electrical signal directed to the solenoid actuated pilot stage and is engaged by decreasing the electrical power to the solenoid. Under normal operating conditions, the electronics can be programmed to control the rate of decrease in the electrical power and thus modulate the engagement of the brake under controlled conditions.

However, one of the problems encountered occurs when an electrical malfunction occurs and the control valve is uncontrollably moved to a brake engaged position. When this happens, the brakes could be applied very abruptly without any warning to the operator.

Thus, what is needed is a two stage electrohydraulic pressure control valve that includes a mechanism for modulatably controlling the engagement of a spring applied pressure released brake when the electrical power to the solenoid is suddenly lost.

The present invention is directed to overcoming one or more of the problems as set forth above.

DISCLOSURE OF THE INVENTION

In one aspect of the present invention, a two stage electrohydraulic pressure control valve includes a force controlled main stage having first and second ends and an output port connected to the first end, an energy storage device having a storage chamber connected to the second end of the main stage, and a shutdown valve mechanism connected to the storage chamber. The shutdown valve mechanism has a flow control means for blocking fluid flow from the storage chamber when fluid passing through the fluid control means exceeds a predetermined flow rate, and flow restricting means for restricting fluid flow from the storage chamber. A solenoid controlled pilot stage is connected to the shutdown valve mechanism.

BRIEF DESCRIPTION OF THE DRAWINGS

FIGS. 1, 2 and 4 are diagrammatic schematic illustrations of alternate embodiments of the present invention;

FIG. 3 is a cross sectional view taken along line 3—3 of FIG. 2; and

BEST MODE FOR CARRYING OUT THE INVENTION

Figure 4:
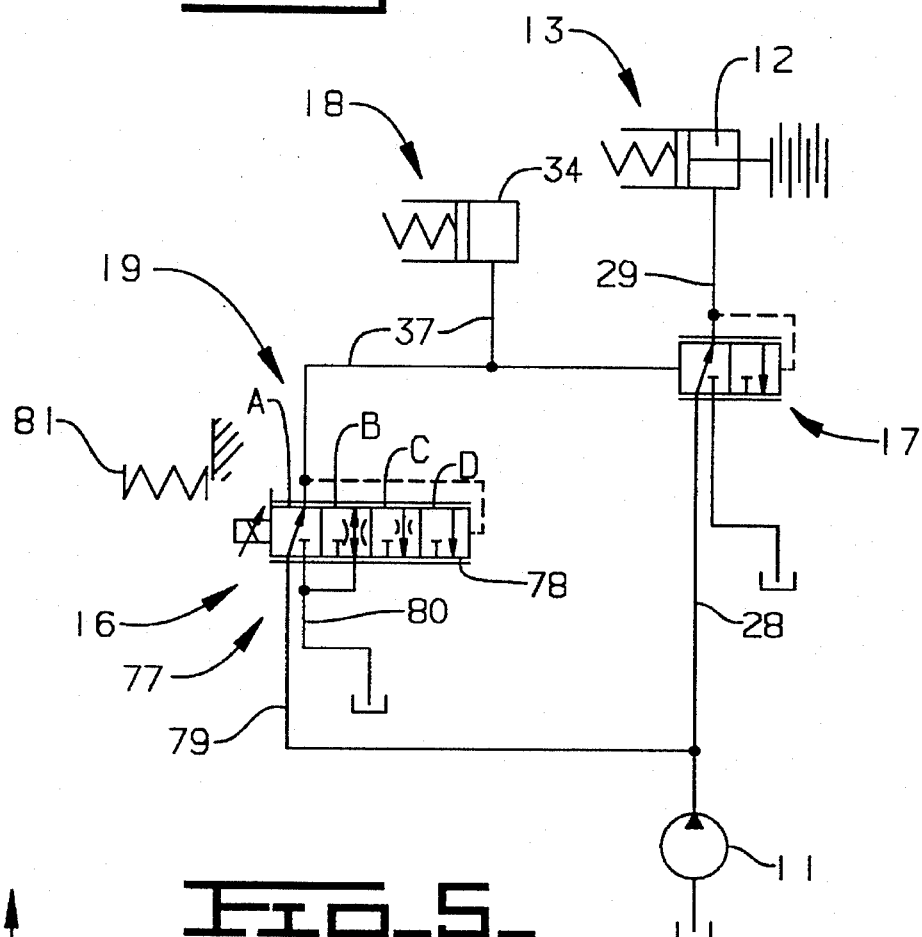

Referring to FIG. 1, a two stage electrohydraulic pressure control valve 10 receives fluid from a pump 11 and directs a control pressure to a fluid chamber 12 of a spring applied pressure released brake 13. The brake 13 has a spring 14 for applying or engaging the brake.

The control valve 10 includes a solenoid controlled pilot stage 16, a force controlled main stage 17, an energy storage means 18 for allowing instantaneous independent movement of the main stage relative to the pilot stage and a shutdown mechanism 19. The pilot stage valve 16 has an input port 20 connected to the pump 11 through a fixed supply orifice 21, a drain port 22 connected to a tank 23, and a regulated pressure passage 24 continuously communicating with an end 26 of the pilot stage.

The main stage 17 is connected to the pump 11 through an input port 28 and to the fluid chamber 12 through an outlet port 29 which continuously communicates with an end 31 of the main stage. The pilot stage 16 provides a regulated pressure at lower flows for the larger main stage that handles the main control flow from the pump to the brake.

The energy storage means 18 includes an accumulator 32 having a piston 33, a fluid storage chamber 34 defined at one side of the piston and connected to another end 36 of the main stage through a passage 37, and a spring 38 disposed at the other end of the piston. While the accumulator 32 is shown separated from the main stage, they can advantageously be positioned within a common bore and share a common fluid chamber connected to the passage 37.

The shutdown valve mechanism 19 in this embodiment is disposed between the passages 24 and 37 and has a flow control means 39 for blocking fluid flow from the storage chamber 34 to the pilot stage 16 when fluid flow passing therethrough from the passage 37 to the passage 24 exceeds a predetermined flow rate, a pressure relieving means 41 for reducing the fluid pressure in the storage chamber 34 when the flow control means is in a flow blocking mode, and a flow restricting means 42 for restricting fluid flow from the storage chamber to the passage 24.

The flow control means 39 includes a flow control valve 43 disposed between the passages 24 and 37 which continuously communicate with opposite ends 44,46 respectively. The flow control valve is movable between open and closed positions and is biased to the open position shown by a spring 47. Fluid pressure in the passage 24 exerts a spring aiding force against the flow control valve while fluid pressure in the passage 37 exerts a spring opposing force against the flow control valve. A trigger orifice 48 is serially disposed between the passages 24 and 37.

The pressure relieving means 41 includes a pressure relief valve 51 disposed between and connected to the passages 24 and 37 in parallel to the flow control valve 46. The relief valve is biased to a closed position shown by a spring 52 disposed at an end 53. The passage 24 continuously communicates with the end 53 so that a spring aiding force is applied to the relief valve. The passage 37 continuously communicates with an end 54 so that a spring opposing force is exerted on the relief valve.

The means 42 includes a modulating orifice 56 disposed between the passages 24 and 37 and in parallel with the flow control valve and the relief valve.

An alternate embodiment of a pressure control valve 10 of the present invention is disclosed in FIGS. 2 and 3. It is noted that the same reference numerals of the first embodiment are used to designate similarly constructed counterpart elements of this embodiment. In this embodiment, however, the functional aspects of the flow control, pressure relieving and flow restricting means 39,41,42 are all incorporated within a single shutdown valve mechanism 19. The valve mechanism includes a spool 58 slidably disposed within a bore 59 of a cylindrical insert 61 suitably fixed within a body 62. A flange 63 is connected to the spool 58 and disposed within a chamber 64. The spool includes a longitudinally extending passage 66 opening into the chamber 64 and three circumferentially spaced radial passage 67 communicating with the passage 66. A spring 68 is disposed between the insert 61 and a retainer 69 suitably secured to the spool 58 for resiliently biasing the spool to the position shown as determined by engagement between the flange 63 and the insert 61. As more clearly shown in FIG. 3, a pair of parallel slots 71 in the insert communicate the bore 59 with a chamber 72 in the housing 62. The passage 24 communicates with the passage 64 through a port 73 while the passage 37 communicates with the port 72 through a port 74. The functions of the springs 47,52 of FIG. 1 are embodied within the single spring 68 of this embodiment. The diameter of the spool 58 is slightly smaller than the diameter of the bore 59 to provide a diametral clearance 76 (exaggerated for illustration in FIG. 3). The interaction between the passages 67 and the clearance 76 serve to establish the modulating orifice 56 when the spool is moved leftward and the passages 67 enter the bore 59. The passages 67 provide the function of the orifice 48 of the flow control valve 43 in FIG. 1. Finally, the coaction between the passages 67 and the slots 71 upon extreme leftward movement of the spool 58 against the bias of the spring 68 serve as the relief valve 51 of the FIG. 1 embodiment.

Another embodiment of a pressure control valve 10 of the present invention is disclosed in FIG. 4. It is noted that the same reference numerals of the first and second embodiment are used to designate similarly constructed counterpart elements of this embodiment. In this embodiment, however, the pilot stage 16 is integrated into the shutdown valve mechanism 19 as represented schematically by the reference numeral 77. The integrated valve mechanism 77 includes a spool 78 for controlling fluid flow between an input port 79 and the passage 37 and between the passage 37 and an outlet port 80. A shutdown spring 81 is maintained in a preloaded condition and constrained so it does not affect normal opening of the pilot stage. The valve spool 78 is movable between four operating positions represented by the letters A,B,C and D. The "A" position provides the function of the pilot stage, the "B" position provides the function of the flow control valve, the "C" position provides the function of the modulating orifice, and the "D" position provides the function of the shutdown relief valve.

Figure 5:
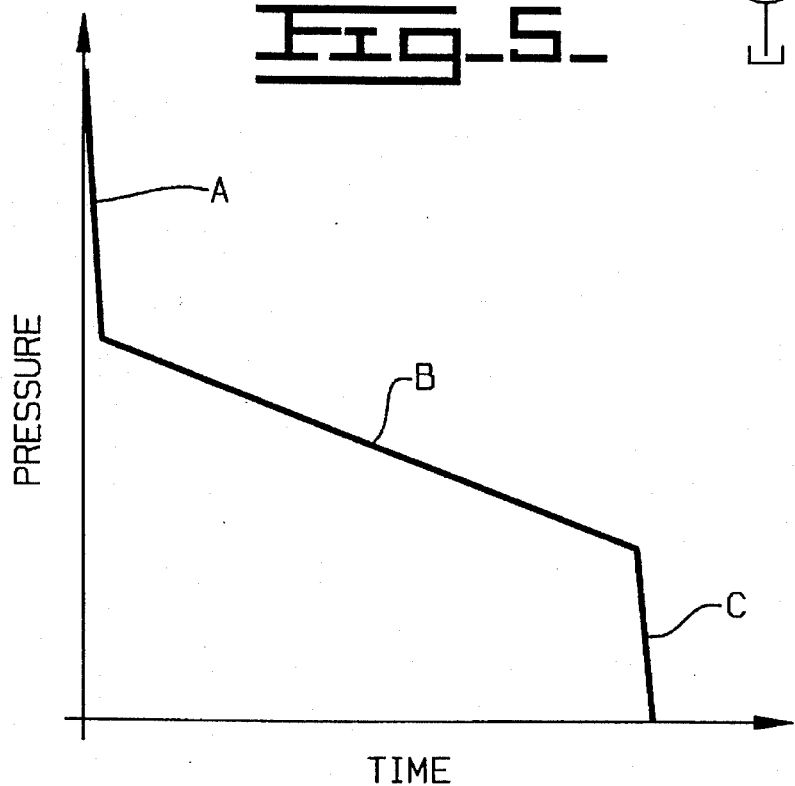
FIG. 5 is a pressure/time curve illustrating features of the present invention.

FIG. 5 is a graph illustrating a pressure decay versus time when the electrical power to the pilot stage is lost. Curve "A" depicts the rate of pressure decay when the relief valve is open, curve "B" depicts the rate of pressure decay when the accumulator chamber is being vented through the modulation orifice and curve "C" depicts the rate of pressure decay when the flow control valve reopens.

Industrial Applicability

The pressure control valve of FIG. 1 is shown in its brake disengaged position for convenience in describing the operation thereof. More specifically, the pilot stage 16 is shown in an energized position established by directing electrical power thereto to regulate the pressure in the passages 24 and 37 such that the actuating chamber 34 is filled with pressurized fluid. The fluid pressure in the passage 37 also urges the main stage 17 to the position shown to communicate fluid from the pump to the brake chamber 12 such that the spring 14 is compressed and the brake disengaged.

Should electrical power to the pilot stage 16 be lost, the pilotstage immediately opens communicating the passage 24 to the tank 23. This removes the spring adiding force exerted on the flow control valve 46 and the relief valve 51 and creates a flow path from the chamber 32 to the tank through the orifice 48. The initial rush of fluid flowing through the orifice 48 creates a pressure drop there across and a spring opposing force is exerted on the flow control valve sufficient to move it to its closed portion. When the flow control valve closes, a spring opposing force is then exerted on the relief valve 51 sufficient to open it thereby quickly dropping the pressure in the passage 37 to a predetermined level represented by the junction of lines "A" and "B" on FIG. 5 and then closes. As the pressure in the passage 37 decays, the main stage 17 stage starts to move to a position initiating venting of the brake chamber 12. The predetermined pressure level in these embodiments is selected so that the spring 14 initiates engagement of the brake slightly before the predetermined pressure level is reached. The closing of the relief valve forces the remaining fluid in the actuating chamber 32 to pass through the shutdown orifice 56 which slowly drains the fluid to decrease the pressure in the accumulator chamber 34 at a rate depicted by the line "B" on FIG. 5. During this phase, the brakes are modulatably engaged. When the pressure decays to a level depicated by the junction of lines "B" and "C", the flow control valve reopens and full force of the spring is utilized for applying the brake.

During normal operation, the electrical power to the pilot stage is controllably reduced at a rate that will not cause the flow control valve to move to its closed position.

Engagement of the brake of the FIG. 2 embodiment is substantially the same as described above with the exception that the fluid control valve, relief valve and shut down modulating orifice functions are provided by the same spool 5. More specifically, when the pressure in the chamber 64 is suddenly reduced due to a power loss to the pilot stage, the sudden rush of fluid through the passages 67 from the passage 37 and accumulator chamber 34 create a pressure drop there across sufficient to move the spool leftward. When the passages 67 enter the bore 59, communication between the chamber 72 and the passage 66 is substantially blocked such that the pressure in the chamber 72 thereby acts to quickly move the spool to the pressure reliving position established by at least one of the passages 67 opening into one of the slots 71. When the pressure in the chamber 72 decays to the predetermined level, as described above, the valve spool 58 moves rightward causing the passages 67 to re-enter the bore 59 to establish the shutdown modulating orifice 61. As the pressure in the chamber 72 and the accumulator chamber 34 is reduced by the shutdown orifice 61, the spool 67 gradually moves rightward until the passages 67 exit the bore to again establish the open position of the flow control valve, thereby draining off the remaining pressure in the accumulator chamber 34.

The pressure control valve of the embodiment of FIG. 4 functions similarly to that described above with the exception that the passage 37 is connected to the outlet port 80 at the "B", "C" and "D" positions as opposed to passing through the pilot stage as described above. Moreover, directing electrical power to the solenoid causes the spool to move rightward to the position "A" such that the pilot stage functions as a proportional valve to maintain the pressure in the passage 37 at a level proportional to the strength of the power to the solenoid.

In view of the above, it is readily apparent that the structure of the present invention provides a two-stage electrohydraulic pressure control valve 10 that modulatably controls engagement of a spring applied, pressure released brake 13 when electrical power directed thereto is suddenly lost. This is accomplished by incorporating a shutdown valve mechanism 19 between a pilot stage 16 and a main stage 17 to controllably reduce the fluid pressure in an accumulator storage chamber 34 in three distinct stages. The first stage is the immediate blocking of fluid flow from the storage chamber by a flow control valve 46 when fluid passing therethrough in one direction exceeds a predetermined flow rate. The second stage is reducing the fluid pressure in the storage chamber to a predetermined level by a relief valve 51 when the flow control valve is in its flow blocking position. The third stage is accomplished by restricting fluid flow from the storage chamber at a predetermined flow rate so that the main stage modulatably controls the reduction of fluid pressure in the brake chamber 12.

Other aspects, objects, and advantages of this invention can be obtained from a study of the drawing, the disclosure and the appended claims.

I claim:

1. A two stage electrohydraulic pressure control valve comprising:
   a force controlled main stage having first and second ends and an output port connected to the first end;
   an energy storage device having a storage chamber connected to the second end of the main stage; and
   a shutdown valve mechanism connected to the storage chamber and having flow control means for blocking fluid flow from the storage chamber when fluid passing through the flow control means exceeds a predetermined flow rate, and flow restricting means for restricting fluid flow from the storage chamber; and
   a solenoid controlled pilot stage connected to the shutdown valve mechanism.

2. The pressure control valve of claim 1 wherein the shutdown mechanism includes pressure relieving means for reducing fluid pressure in the storage chamber to a predetermined level when the fluid control means is in the flow blocking condition.

3. The pressure control valve of claim 2 wherein the flow control means includes a flow control valve movable between open and closed positions and being resiliently biased to the open position, the flow control valve having an orifice sized to generate a pressure differential thereacross sufficient to move the flow control valve to the closed position when fluid passing therethrough exceeds the predetermined flow rate.

4. The pressure control valve of claim 3 wherein the pressure relieving means includes a pressure relief valve disposed in parallel with the flow control valve and has closed and open positions, and which is resiliently biased to the closed position and is movable to the open position when pressure in the storage chamber exceeds the predetermined level and the flow control valve is in the closed position.

5. The pressure control valve of claim 4 wherein the flow restricting means includes a modulating orifice disposed in parallel with the pressure relief valve.

6. The pressure control valve of claim 5 wherein the flow control valve, pressure relief valve, and modulating orifice are integrated within a common valve.

7. The pressure control valve of claim 6 where the common valve includes a housing having a bore therein, a spool slidably disposed in the bore and movable between a first position establishing the open position of the flow control valve and the blocking position of the relief valve, a second position establishing the closed position of the flow control valve and the open position of the pressure relief valve, and a third position establishing the modulating orifice and the closed positions of the flow control valve and the relief valve, and a spring biasing the spool toward the first position.

8. The pressure control valve of claim 7 wherein the spool defines a first chamber connected to the pilot stage and a second chamber connected to the storage chamber and the second end of the main stage.

9. The pressure control valve of claim 8 wherein the spool includes an axially extending passage opening into the first chamber and a radial passage communicating the second chamber with the passage at the first and second positions of the spool.

10. The pressure control valve of claim 9 including a predetermined annular clearance defined between the spool and the bore and the radial passage communicates the annular clearance with the axially extending passage at the third position of the spool.

11. The pressure control valve of claim 10 wherein the pilot stage is hydraulically connected to the shutdown valve mechanism and is biased to an open position when no electrical power is transmitted thereto.

12. The pressure control valve of claim 10 wherein the pilot stage is mechanically connected to the shutdown valve mechanism, the shutdown valve mechanism having an inlet port and an outlet port.

* * * * *